United States Patent
Arai et al.

(10) Patent No.: US 6,760,368 B1
(45) Date of Patent: Jul. 6, 2004

(54) FAST RETRAINING METHOD, APPARATUS, AND STORAGE MEDIUM IN AN XDSL TRANSCEIVER

(75) Inventors: Yasuhiro Arai, Kawasaki (JP); Masato Hori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/536,526

(22) Filed: Mar. 28, 2000

(30) Foreign Application Priority Data

Apr. 6, 1999 (JP) .......................................... 11-098869

(51) Int. Cl.[7] ................................................ H04L 5/14
(52) U.S. Cl. ..................... 375/222; 379/93.32; 370/292
(58) Field of Search ................................ 375/222, 224, 375/225, 227, 228, 231, 220; 379/1.03, 1.04, 22.08, 29.07, 30, 93.01, 93.28, 93.32, 93.33, 93.31; 370/493, 494, 495, 286, 292, 465, 466, 480, 463, 282, 2

(56) References Cited

U.S. PATENT DOCUMENTS

| | | | | |
|---|---|---|---|---|
| 5,144,625 A | * | 9/1992 | Cain et al. ................... | 370/522 |
| 5,841,809 A | | 11/1998 | Koizumi et al. | |
| 5,903,602 A | * | 5/1999 | Torkkel ....................... | 375/222 |
| 5,946,616 A | * | 8/1999 | Schornack et al. ........ | 455/426.1 |
| 6,101,216 A | * | 8/2000 | Henderson et al. ......... | 375/222 |
| 6,151,335 A | * | 11/2000 | Ko et al. ..................... | 370/487 |
| 6,161,203 A | * | 12/2000 | Zuranski et al. ............ | 714/707 |
| 6,252,901 B1 | * | 6/2001 | Mueller et al. ............. | 375/222 |
| 6,263,077 B1 | * | 7/2001 | Zuranski et al. ....... | 379/406.08 |
| 6,266,348 B1 | * | 7/2001 | Gross et al. ................ | 370/493 |
| 6,345,071 B1 | * | 2/2002 | Hamdi ....................... | 375/222 |
| 6,430,219 B1 | * | 8/2002 | Zuranski et al. ............ | 375/231 |
| 6,445,733 B1 | * | 9/2002 | Zuranski et al. ............ | 375/231 |
| 6,549,520 B1 | | 4/2003 | Gross et al. | |
| 6,567,464 B2 | | 5/2003 | Hamdi | |
| 6,587,502 B1 | * | 7/2003 | Hendrichs et al. .......... | 375/222 |
| 2001/0048667 A1 | | 12/2001 | Hamdi | |
| 2003/0026282 A1 | | 2/2003 | Gross et al. | |

FOREIGN PATENT DOCUMENTS

| | | |
|---|---|---|
| JP | 57-124952 | 8/1982 |
| JP | 9-163023 | 6/1997 |
| JP | 9-163033 | 6/1997 |
| JP | 9-326729 | 12/1997 |
| JP | 10-303872 | 11/1998 |
| JP | 2001-519620 | 10/2001 |
| JP | 2001-520487 | 10/2001 |

\* cited by examiner

*Primary Examiner*—Khai Tran
*Assistant Examiner*—Khanh Cong Tran
(74) *Attorney, Agent, or Firm*—Katten Muchin Zavis Rosenman (57) ABSTRACT

The process in an xDSL transceiver transfers into a fast retraining sequence when the cause of an error on a telephone circuit is a change from an off hook state to an on hook state of a telephone instrument, a signal indicating an inversion of polarity of a signal on the telephone circuit, a change from an on hook to an off hook and when a handshake waiting time has passed without detecting a predetermined signal on the telephone circuit, or when the predetermined signal is detected within the handshake waiting time. The handshake waiting time can be updated in accordance with a dial pulse width, the maximum number of digits in the dial pulse signal, and the maximum number of pulses in one digit, or depending on whether or not the dial pulse comes from NTT.

12 Claims, 7 Drawing Sheets

FAST RETRAINING METHOD, APPARATUS, AND STORAGE MEDIUM IN AN XDSL TRANSCEIVER

BACKGROUND OF THE INVENTION

Field of the Invention

The present invention relates to a fast retraining method, a fast retraining apparatus, and a storage medium for storing a program of a fast retraining method, for implementing a high speed acquisition of synchronism in an xDSL transceiver such as an Asymmetric Digital Subscriber Line (ADSL) transceiver. In particular, the present invention relates to a technique for acquisition of synchronism at high speed in a simple version of an ADSL, i.e., an Universal ADSL, which does not need a splitter for separating high frequency components for the ADSL communication from low frequency components for usual telephone communication.

The ADSL transceiver is a unit for implementing a high speed data transmission by utilizing a conventional telephone circuit (see, for example, Japanese Unexamined Patent Publication (Kokai) No. 10-303872, and "Special Corner, Start to Count Down, ADSL for a Country of Light" in Nikkei Communication, Dec. 7, 1998). That is, while a telephone circuit uses a low frequency band of 300–3400 Hz, an ADSL transceiver utilizes a high frequency band of 25 KHz to 552 KHz (ITU-F 992.2 standard of 25 KHZ) or 25 KHz to 1.1 MHz (ITU-G. 992.1 standard). When a usual telephone circuit is being used, the frequency band is usually limited to the above-mentioned low frequency band (300 to 3400 Hz). However, even when the telephone circuit is being used, some of the control signals such as an off hook signal, an on hook signal, a polarity inverted signal which is generated when the telephone circuit is switched from a released state to a terminating state, a voltage change of a ring signal, etc., leak to the frequency band of 25 KHz or more used in ADSL communication.

In normal ADSL (the ADSL (G. dmt) of G.992.1 standard) communication, a frequency splitter is provided in the telephone circuit to remove the above-mentioned leakage signal.

In Universal ADSL communication, however, the frequency splitter is not provided in the telephone circuit so that the above-mentioned leakage signal is superimposed on the ADSL line to interrupt data communication.

That is, in Universal ADSL communication, every time a telephone instrument goes on hook or off hook during data communication by the ADSL transceiver, the data communication is stopped or an error is generated.

In general, when the ADSL transceiver detects an error generated on the telephone circuit, the ADSL transceiver is automatically reset to perform an initial training to restart the communication.

However, in Annex-C (ISDN Special Noise Removing Additional Recommendation) of the G.992.2 standard, the above-mentioned initial training takes a long time, i.e., about 20 seconds plus several seconds. Therefore, the leakage of a control signal from the telephone circuit causes significant damage to the ADSL data communication.

In view of the above problem, the G.992.2 standard defines a fast retraining sequence, whereby a faster data communication recovery can be realized. According to this fast retraining sequence, when an error is generated in a telephone circuit during data communication, the process enters into the fast retraining sequence, and then the ADSL transceiver checks the state of a telephone instrument which is provided outside of the ADSL transceiver. For example, when the telephone circuit is changed from about 48V in an open state (i.e., an on hook state of the telephone instrument) to about 6V when the telephone instrument is off hook so that the telephone circuit is terminated, the ADSL transceiver searches whether there is data indicating an off hook profile in a memory in the ADSL. transceiver. If there is no such profile, the fast retraining sequence is stopped, and after effecting an initial training of about 20 seconds plus several seconds, the data communication is started again. Thus, when there is no profile which matches the state of the telephone circuit, or when the ADSL transceiver fails to handshake with the other station within a predetermined time, the fast retraining sequence is stopped and the process transfers to the initial training. Here, the handshake means an exchange of a profile or an exchange of an S/N level between two transceivers or modems.

If, however, there is an off hook profile, the initial training is not carried out, and after the fast retraining sequence which takes only 5 to 6 seconds, the data communication is carried out.

In this way, when the state of an ADSL transceiver changes from an initial training to data communication, various parameters such as a parameter for an automatic gain control (AGC), a parameter for a phase locked loop (PLL), the depth of codes of a Reed-Solomon Block Coding for error correction, an on hook state, an off hook state, an open circuit voltage and a terminating voltage of the telephone circuit, etc., are stored as profiles (i.e., initial values). In the initial training, matching of these parameters is effected between a center and a user's home by handshaking, and the matched parameters are stored in the memory in the ADSL transceiver.

Then, when the process changes to a fast retraining sequence, if there is a profile which matches the line characteristics after the state of the ADSL transceiver has been changed, the process does not change to the initial training but a data communication is carried out after executing the fast retraining sequence.

Also, only when there is no profile which matches the line characteristics after the state of the ADSL transceiver has been changed, the process proceeds to the initial training.

In this way, the data communication be started earlier.

When the above procedure is applied to an actual telephone circuit, however, the following problems arise.

In the control signals of a telephone circuit, there are signals such as dial pulses which disturb the operation of an ADSL transceiver. In the following, an example is described in which, when dial pulses from a telephone circuit are generated, it is difficult to effect the fast retraining sequence.

When a telephone instrument at a calling side goes off hook, noises are injected into the high frequency band for the ADSL communication which causes data errors. In response to the occurrence of these errors, the ADSL transceiver starts the fast retraining sequence. In response to the start of the fast retraining sequence, a handshaking between one ADSL transceiver and another ADSL transceiver is started. However, the telephone instrument continues to generate the dial pulses. Each time the dial pulse is generated, a noise is generated. Due to the noise, the handshaking, including profile exchange or S/N level exchange, fails. In the prior art, when handshaking failures are repeated for a predetermined number of times, it is deemed that the fast retraining sequence has failed so that the fast retraining sequence times out, and the process changes to an initial training which requires about 20 seconds plus several seconds. Therefore, the state of the ADSL transceiver cannot be expected to recover to the data communication status within a short time.

In addition, as is well known, each of the ten numbers is expressed by a number of dial pulses. Assuming that the number of pulses for a unit of time is 10 pulses per second, then the maximum time necessary to send ten digits is about 10 seconds, i.e., (10 pulses/10 pps)×10 digits.

It is possible to incorporate this maximum time as a waiting time into the fast retraining sequence, however, if the fast retraining sequence is so constructed, the timer will start to count the above-mentioned maximum time even by an on hook or off hook operation of a telephone instrument without generating any dial pulse, and consequently it will become impossible to "recover to the data communication status within a short time" which is the advantage of the fast retraining sequence. Further, when a local communication is effected, an out-of-town telephone exchange number is not necessary so that the sending of the dial pulses is performed within a short time, considerably shorter than the maximum necessary time. In this condition, if the waiting time is set to be the maximum time necessary to send ten digits, a problem arises in that the time wasted while waiting becomes too long.

SUMMARY OF THE INVENTION

Accordingly, an object of the present invention is to provide a fast retraining method in an xDSL transceiver, a fast retraining apparatus in an xDSL transceiver, and a storage medium for storing a program of a fast retraining method in an xDSL transceiver.

To attain the above object, there is provided, according to a first aspect of the present invention, a fast retraining method in an xDSL transceiver comprising the steps of: detecting an error in a telephone circuit connected to the xDSL transceiver; and changing the process in the xDSL transceiver to a fast retraining sequence when the cause of the error is an event other than a change from an on hook state to an off hook state of a telephone instrument connected to the telephone circuit.

According to the second aspect of the present invention, the above-mentioned event is a change from an off hook state to an on hook state of a telephone instrument connected to the telephone circuit.

According to the third aspect of the present invention, the event mentioned in the first aspect is an inversion of the polarity of a signal of the telephone circuit.

In the first to third aspects of the present invention, the fast retraining sequence is forced to be carried out regardless of whether or not a dial pulse is detected. Therefore, the time out of the fast retraining sequence due to the reception of a dial pulse does not occur, and consequently the recovery time of the xDSL data communication is shortened.

According to the fourth aspect of the present invention, there is provided a fast retraining method in an xDSL transceiver, in which, when an error is detected on a telephone circuit connected to the xDSL transceiver, and when the cause of the error is a change from an on hook state to an off hook state of a telephone instrument connected to the telephone circuit, a predetermined handshake waiting time is set. The handshake waiting time starts from the time of a change from an on hook state to an off hook state of a telephone instrument connected to the telephone circuit, and has a length longer than a dial pulse waiting time. The process in the xDSL transceiver changes to a fast retraining sequence when the handshake waiting time has passed without detecting a predetermined signal in the telephone circuit.

Since the fast retraining sequence is forcibly carried out when the handshake waiting time, which is set to be longer than the dial pulse waiting time, has passed, regardless of whether or not the dial pulse is detected, the fast retraining sequence does not time out due to dial pulse reception, and consequently the recovery time of the ADSL data communication is shortened.

According to the fifth aspect of the present invention, when a predetermined signal in the telephone circuit is detected within the above-mentioned handshake waiting time, the process changes to a fast retraining sequence.

Since, regardless of whether or not the dial pulse is detected, the fast retraining sequence is forcibly carried out when the predetermined signal is detected within the handshake waiting time, which is set to be longer than the dial pulse waiting time, the fast retraining sequence does not time out due to dial pulse reception, and consequently the recovery time of the xDSL data communication is shortened.

According to the sixth aspect of the present invention, when a dial pulse signal in the telephone circuit is detected within the above-mentioned handshake waiting time, the pulse width of the dial pulse signal is measured, and the handshake waiting time is updated by a product $t=N\times p$, where p is the dial pulse width, and N equals the maximum number of digits in the dial pulse signal multiplied by the maximum number of pulses per one digit. The process in the xDSL transceiver changes to a fast retraining sequence when the updated handshake waiting time has passed without detecting a predetermined signal in the telephone circuit.

In the sixth aspect of the present invention, when a dial pulse signal in the telephone circuit is detected within the handshake waiting time, the handshake waiting time is updated in accordance with the pulse width of the dial pulse signal and the maximum number of digits in the dial pulse signal. The fast retraining sequence is forcibly carried out when the updated handshake are waiting time times out. Since the updated handshake waiting time is longer than the maximum dial pulse duration, the process does not change to the fast retraining sequence during the dial pulses duration, and consequently, during the dial pulse duration, the process does not fail to change to the fast retraining sequence so that the recovery time of the ADSL data communication is shortened.

According to the seventh aspect of the present invention, the process in the xDSL transceiver changes to a fast retraining sequence when a predetermined signal in the telephone circuit is detected within the updated handshake waiting time which is defined in the sixth aspect of the invention.

In the seventh aspect of the present invention, since the fast retraining sequence is forcibly carried out when the predetermined signal in the telephone circuit is detected within the updated handshake waiting time which is longer than the dial pulse duration, the process does not change to the fast retraining sequence during the dial pulses duration, and consequently the recovery time of the ADSL data communication is shortened.

According to the eighth aspect of the present invention, when a dial pulse in the telephone circuit is detected within the handshake waiting time defined in the above-mentioned seventh aspect of the present invention, and when it is determined that the dial pulse comes through a telephone office other than NTT, the value N is updated to N2=N+α, and the handshake waiting time is updated by a calculated value t2=N2×p. Then, when the predetermined signal is detected on the telephone circuit within the updated handshake waiting time, the fast retraining sequence is carried out.

In this way, since the handshake waiting time is updated to an optimum value depending on whether the dial pulse comes through NTT or another telephone office, an optimum recovery time of an ADSL data communication is realized.

In the fourth to eighth aspects of the present invention, the predetermined signal in the telephone circuit is one of a signal indicating that the polarity of a signal in the telephone circuit has been changed, a signal indicating a change from an on hook state to an telephone off hook state of a telephone instrument connected to the telephone circuit, a push button dial signal from the telephone instrument connected to the telephone circuit, a ring-back tone from the telephone instrument connected to the telephone circuit, or busy tone from the telephone instrument connected to the telephone circuit.

Further, according to the present invention, there are provided an apparatus and a storage medium for storing a program which performs the above-mentioned fast retraining sequence.

BRIEF DESCRIPTION OF THE DRAWINGS

The above objects and features of the present invention will be more apparent from the following description of the preferred embodiments when read in conjunction with the accompanying drawings, wherein.

DESCRIPTION OF THE PREFERRED EMBODIMENTS

In the following, an ADSL transceiver is described as an example, however, the present invention can be applied to any type of xDSL transceiver.

Figure 1:
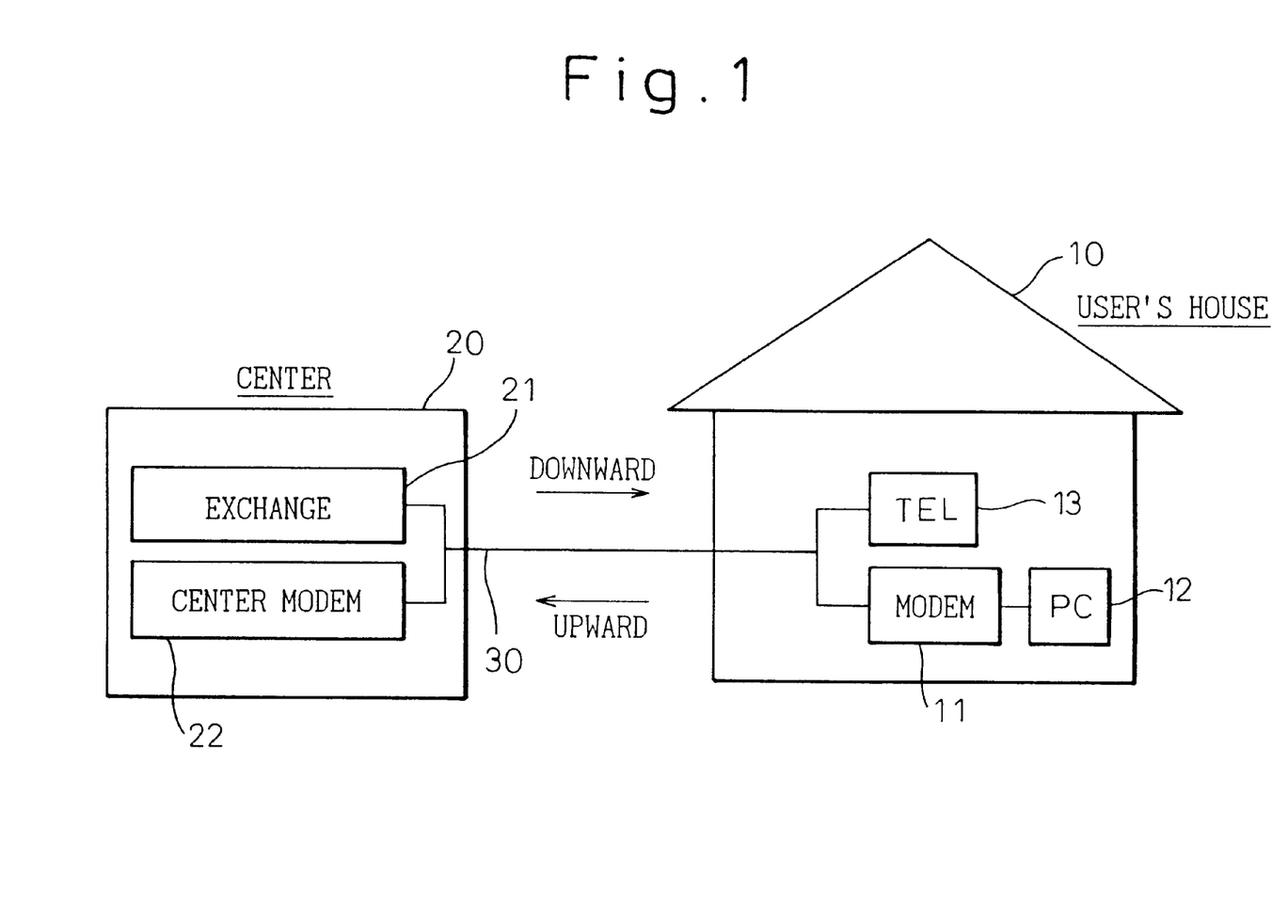
FIG. 1 is a diagram showing an example of an ADSL transmission system to which the present invention is to be applied.

FIG. 1 is a diagram showing an example of the system construction of an ADSL transmission system to which the present invention is to be applied. In the figure, the transmission speed from a user's house 10 to a center 20 is 16–40 Kbps, and the transmission speed from the center 20 to the user's house 10 is 1.5–9 Mbps.

In the system to which the ADSL transmission is to be applied, the user's house 10 and the center 20 are connected by an existing metallic cable 30 made of copper. In an ADSL transmission according to the G.992.2 standard, both the user's house 10 and the center 20 do not have a splitter for separating signals depending on the frequencies, while in an ADSL according to the G.992.1 standard, both the user's house 10 and the center 20 have splitters for separating signals depending on the frequencies.

Figure 2A:
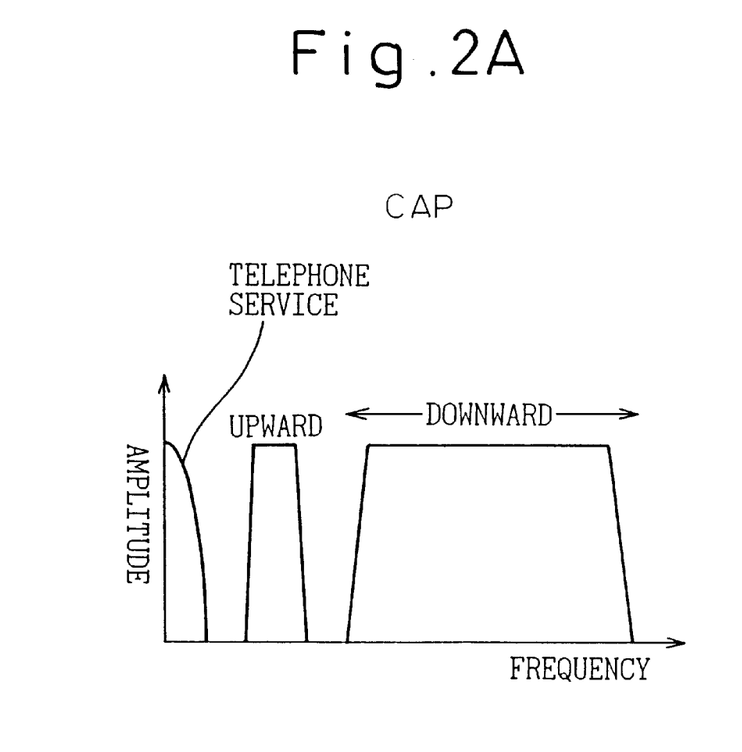
FIGS. 2A and 2B are diagrams for explaining the transmission method used in an ADSL.

FIG. 2A is a diagram showing the construction of a frequency band in a single carrier transmission method called Carrierless Amplitude Phase Modulation (CAP) which is one type of transmission method used in ADSL transmission. As shown in the figure, according to this method, a high speed data transmission is carried out by using one carrier in an upward signal and another one carrier in a downward signal.

Figure 2B:
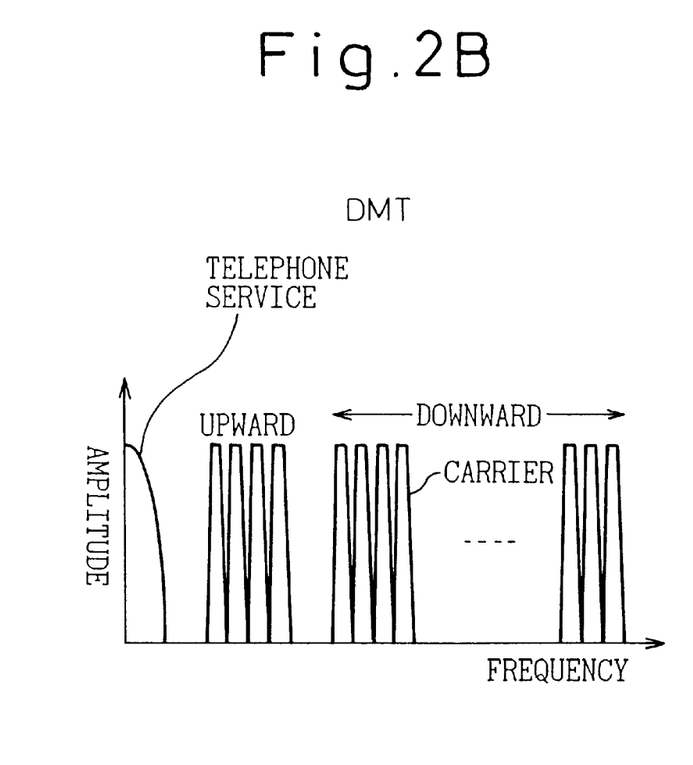

FIG. 2B is a diagram showing a construction of a frequency band in a multi carrier transmission method called Discrete Multitone Transmission (DMT) in which data is divided and sent on a plurality of carriers to perform a high speed data transmission.

In either one of the carrier transmission methods, as mentioned before, the Universal ADSL transmission does not use a splitter so that a leakage signal due to an on hook, an off hook, or an inversion of polarity superimposes on the ADSL line to disturb the data communication.

Figure 3:
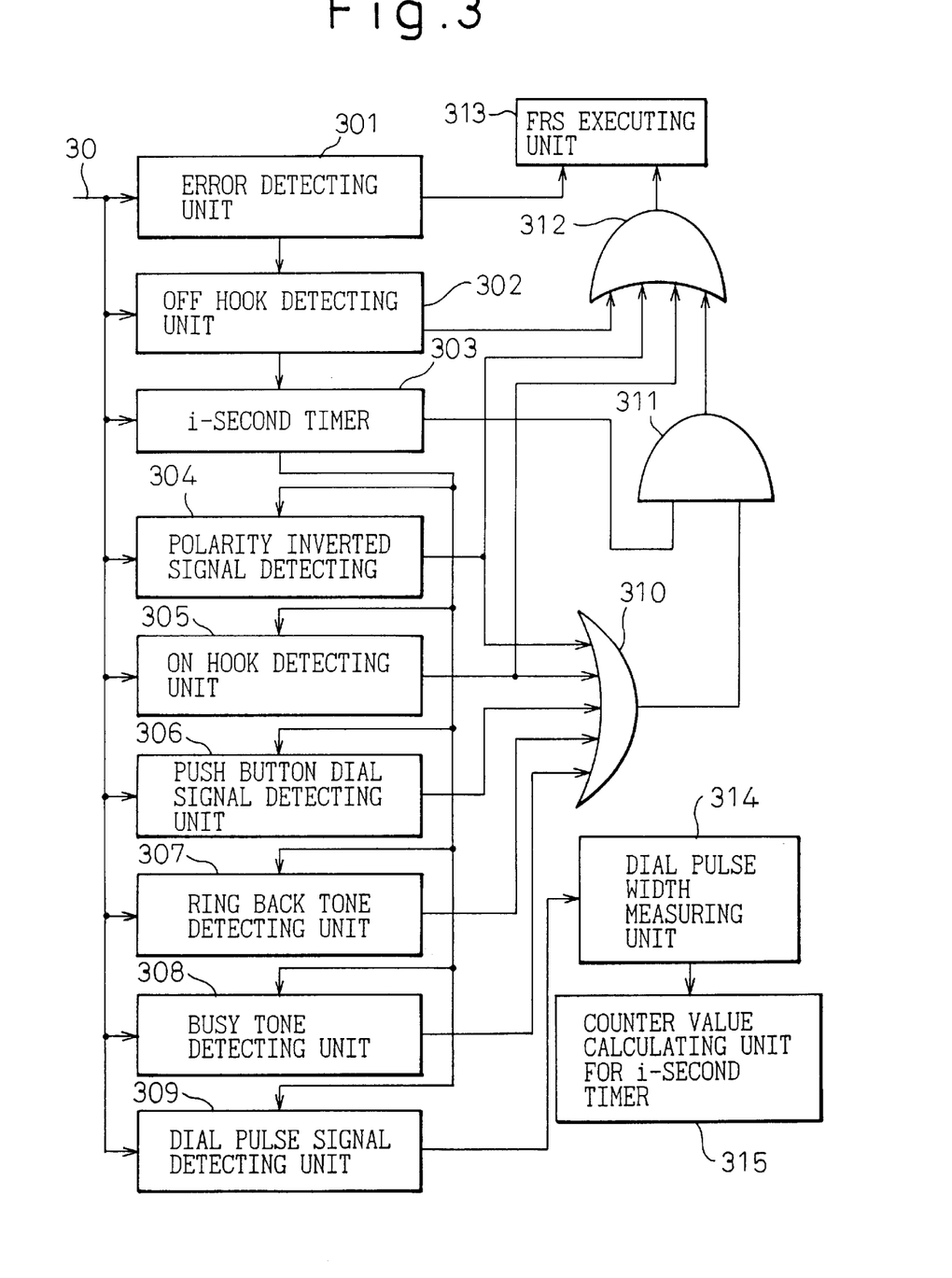
FIG. 3 is a block diagram showing an apparatus of a fast retraining sequence according to an embodiment of the present invention.
Figure 4:
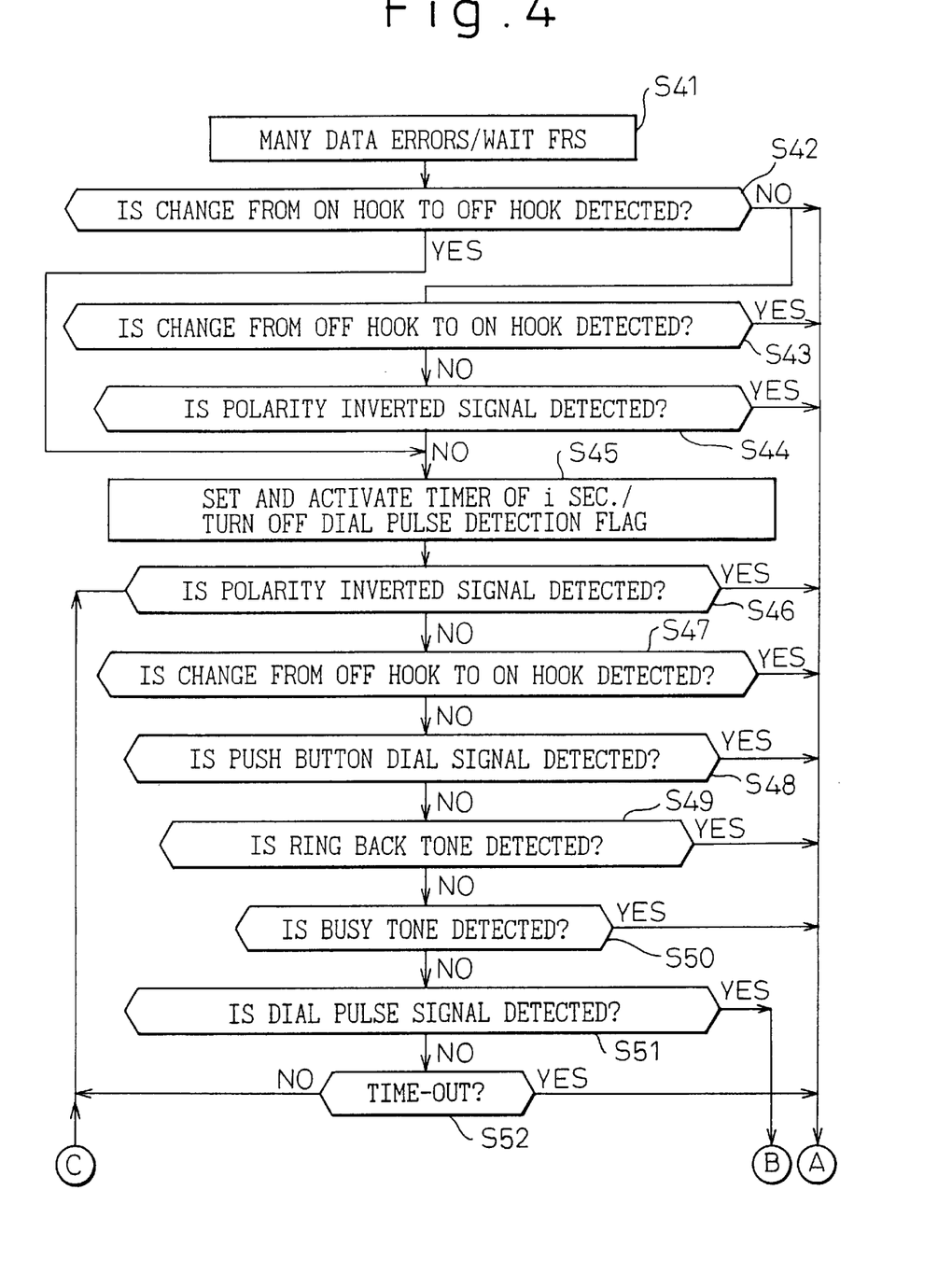
FIG. 4 is a part of a flowchart explaining the operation of the apparatus shown in FIG. 3.
Figure 5:
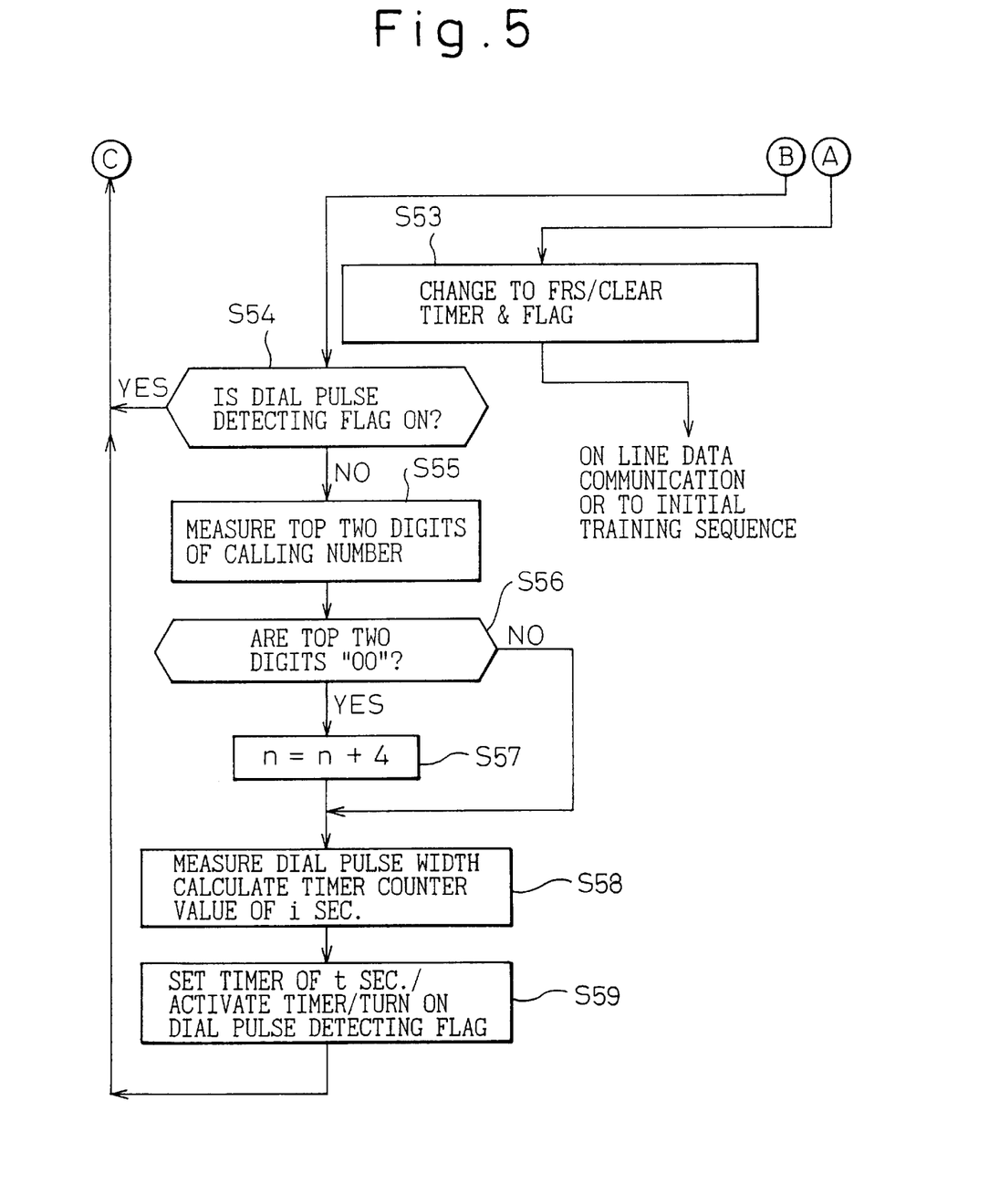
FIG. 5 is a part of a flowchart explaining the operation of the apparatus shown in FIG. 3.

FIG. 3 is a block diagram showing a construction of a fast retraining apparatus according to an embodiment of the present invention. FIG. 4 and FIG. 5 show a flowchart explaining the operation of the apparatus shown in FIG. 3.

The fast retraining apparatus shown in FIG. 3 exists in an xDSL transceiver 11 in a user's house or in an ADSL transceiver 22 in a center 20. The fast retraining apparatus includes an error detecting unit 301, an off hook detecting unit 302, a timer 303 of i seconds, a polarity inverting signal detecting unit 304, an on hook detecting unit 305, a push button dial signal detecting unit 306, a ring back tone detecting unit 307, a busy tone detecting unit 308, a dial pulse signal detecting unit 309, an OR gate 310, an AND gate 312, a dial pulse width measuring unit 314, and a counter value calculating unit 315 for a timer of t seconds.

The operation of the fast retraining apparatus shown in FIG. 3 will be described next with reference to the flowchart of FIG. 4 and FIG. 5.

In FIG. 4, at step S41, when the error detecting unit 301 detects an error generated in the telephone circuit 30, the fast retraining sequence executing unit 313 is activated to put the fast retraining sequence in a waiting state. When the off hook detecting unit 302 detects that the cause of this error generation is an event other than the change of the signal in the telephone circuit caused by changing the state of the telephone instrument from an on hook state (i.e., a state in which the telephone instrument is picked down) to an off hook state (i.e., a state in which a telephone instrument is picked up), the process proceeds to step S53 in FIG. 5 to be changed to the fast retraining sequence regardless of whether or not there is a dial pulse, the timer for i seconds is cleared, and the dial pulse detecting flag is turned off. After the fast retraining sequence is finished, the process proceeds to an on-line data communication or an initial training sequence.

Examples of events other than the change of the state from an on hook to an off hook at step S42 are: a case as in step S43 when the on hook detecting unit 305 detects the change from the off hook to the on hook; a case as in step S44 when the polarity inverted signal detecting unit 304 detects a polarity inverted signal (i.e., an inversion of the polarity of the signal) in the telephone circuit; etc. An example of the case from an off hook to an on hook is, for example, a case when the telephone instrument at the opposite party cuts the communication during data communication by off hooking the telephone instrument. In this case also, noise is generated in the telephone circuit. The polarity of the telephone circuit is rapidly changed between a state of 48V when the telephone circuit is opened and a state of 6V when the telephone circuit is terminated. Therefore, the inversion of the polarity of the telephone circuit is also a cause of the generation of harmonic frequency noise. In this way, when the event is not the case of on hook detection, that is when the event is a case of a change detection from an off hook state to an on hook state of the telephone instrument, a detection of a polarity inverted signal on the telephone circuit, or the like, the fast retraining sequence is forcibly carried out regardless of whether or not there is a dial pulse. Therefore, the problem in the prior art, i.e., the fast retraining sequence is interrupted due to a dial pulse, is overcome.

At step S42, when the off hook detecting unit 302 detects that the cause of the error generation is a change from on hook (picked down telephone instrument) to off hook (picked up telephone instrument), the process proceeds to step S45 where a predetermined waiting time, i seconds, is set in the timer 303. The time of i seconds is set to be longer than the dial waiting time from an off hook of the telephone circuit to the dial starting time. For example, 3 seconds of pre-pause period plus 3 seconds of preliminary time=6 seconds, is appropriate. At step 45 also, the dial pulse detecting flag is turned off.

Then at step S46–S50, when a predetermined signal in the telephone circuit 30 is detected within a handshake waiting time, the process proceeds to step S53 to activate the fast retraining sequence executing unit 313 to change the process to the fast retraining sequence.

As examples of the above-mentioned predetermined signal, there are an inversion of the polarity of a signal in the telephone circuit 30 detected by the polarity inverted signal detecting unit 304, a change detected signal indicating a change from an off hook to an on hook of a telephone instrument detected by the on hook detecting unit 305, a push button dial signal from a telephone instrument detected by the push button dial signal detecting unit 306, a ring back tone from a telephone instrument detected by the ring back tone detecting unit 307, and a busy tone from a telephone instrument detected by the busy tone detecting unit 308.

Even when the handshake waiting time of i seconds times out at step S52 without detecting the predetermined signal in steps S46–S50, the fast retraining sequence executing unit 313 is activated so that the process changes to the fast retraining sequence.

When a dial pulse signal is detected in the telephone circuit within the handshake waiting time of i seconds, without detecting the predetermined signal in step S46–50, the process proceeds to step S54 in FIG. 5 where it is judged whether or not the dial pulse detecting flag is on or off. After setting the timer to i seconds, when the process is in the first cycle for detecting a dial pulse, the dial pulse detecting flag is not still turned on so that the process proceeds to step S55 to detect the top two digits of the calling number.

At step S56, when the top two digits are not "00", it is judged that the calling number is a number passing through Nippon Telephone and Telegraph Corporation (NTT) and the process proceeds to step S58 to measure the dial pulse width p and calculates the value of the timer counter of t seconds. The value of the timer counter of t seconds is t=p×N, where N is a predetermined parameter. The predetermined parameter N is a number obtained, when the calling number comes through NTT, by multiplying the maximum number n of the digits of the telephone number by 10 which is the maximum number of pulses per one digit. That is N=10n, and t=p×10n.

At step S56, when the top two digits are "00", it is judged that the calling number is a number passing through a telephone center other than NTT, such as Kokusai Denshin Denwa Co., Ltd. (KDD), DDI Corporation or the like in New Common Carrier (NCC) system so that the process proceeds to step S58 to update the maximum number n of the digits in the telephone number to, for example, n+4, and then the process proceeds to step S58. In this way, the maximum value of the digits in the telephone number is updated from, for example, 10 to 14, and the predetermined parameter N is updated to N+α.

Then at step S59, the timer of t seconds is set, the timer is activated, and the dial pulse detected flag is turned on, and the process proceeds to step S46. In place of providing the timer of t seconds in addition to the timer of i seconds, the set value of the timer 303 of i seconds shown in FIG. 3 may be changed from i seconds to t seconds.

After setting the timer, the updated time t of the timer is used as the handshake waiting time, and the process returns to step S46.

At step S51 in and after the second cycle, when the dial pulse signal is detected, the judgement at step S54 is YES so that the steps S55–S59 are not carried out, and the process returns to step S46. Accordingly, while receiving the dial pulse signal within the handshake waiting time t, the process does not change to the initial training.

At steps S47–S50 in and after the second cycle, when a predetermined signal in the telephone circuit 30 is detected within the updated handshake time t, the process proceeds to step S53 where the fast retraining sequence executing unit 313 is activated to change the process to the fast retraining sequence.

As examples of the above-mentioned predetermined telephone circuit signaling, similar to the setting of the timer of i seconds, there are an inversion of the polarity of a signal on the telephone circuit 30 detected by the polarity inverted signal detecting unit 304, a change detected signal of a change from an off hook to an on hook of the telephone instrument detected by the on hook detecting unit 305, a push button dial signal from the telephone instrument detected by the push button dial signal detecting unit 306, a ring back tone from the telephone instrument detected by the ring back tone detecting unit 307, and a busy tone from the telephone instrument detected by the busy tone detecting unit 308.

Also, when the timer of t seconds times out within the handshake waiting time, the process proceeds to step S53 so that the fast retraining sequence executing unit 313 changes the process to the fast retraining sequence. Accordingly, even when the timer of t seconds times out within the handshake waiting time, the process does not change to the initial training.

At step S53, in addition to the transfer to the fast retraining sequence, the timer is reset, and the dial pulse detection flag is cleared. Then an on line data communication or the initial training sequence is executed.

FIGS. 6A to 6F show time charts for explaining the above-described operation in more detail.

Figure 6A:
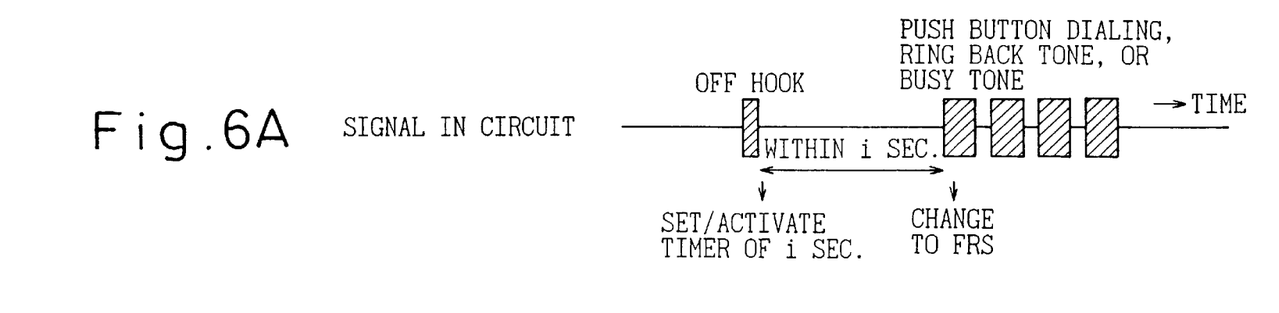
FIGS. 6A–6F are time charts for supplementarily explaining the operation of the flowchart shown in FIGS. 4 and 5.

FIG. 6A shows that, after detecting an off hook at step S42, the timer of i seconds is set at step S45, and then, within the i seconds, when a push button dial signal is detected at step S48, when a ring back tone is detected at step S49, or when a busy tone is detected at step S50, the process transfers to the fast retraining sequence.

Figure 6B:
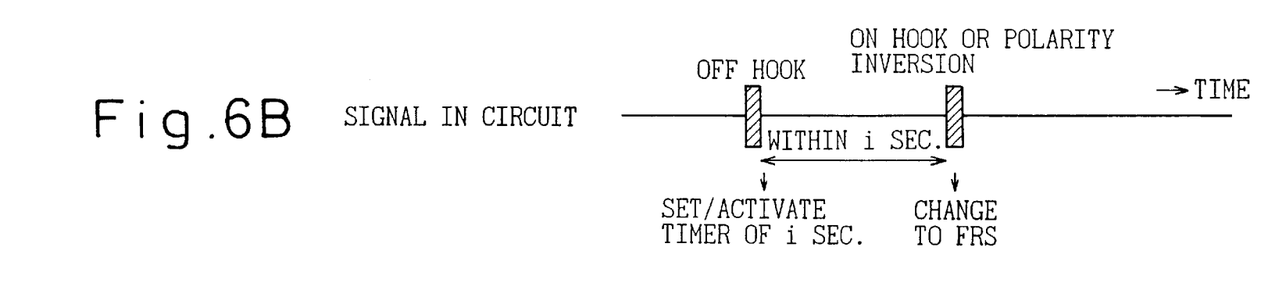

FIG. 6B shows that, after detecting an off hook at step S42, the timer of i seconds is set at step S45, and then, within the i seconds, when a change to an on hook is detected at step S47 or when a polarity inverted signal is detected at step S46, the process changes to the fast retraining sequence at step S53.

Figure 6C:
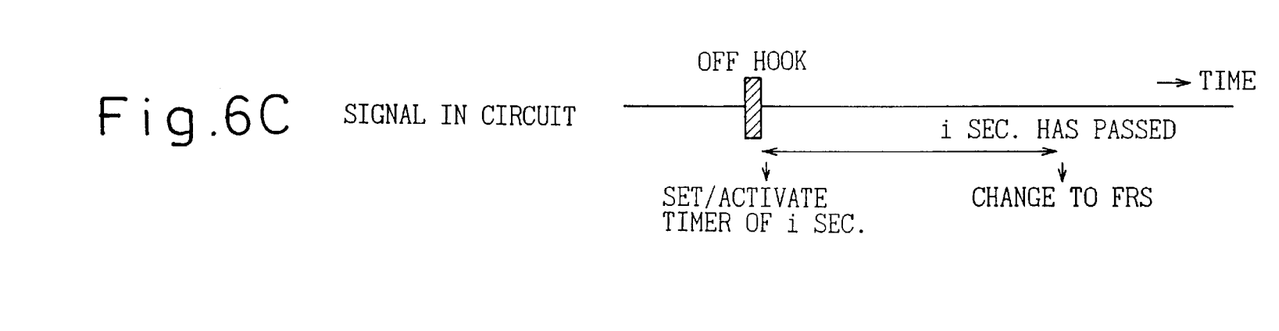

FIG. 6C shows that, after detecting an off hook at step S42, the timer of i seconds is set at step S45, and then, when the timer times out at step S52, the process proceeds to the fast retraining sequence at step S53.

Figures 6D, 6E:
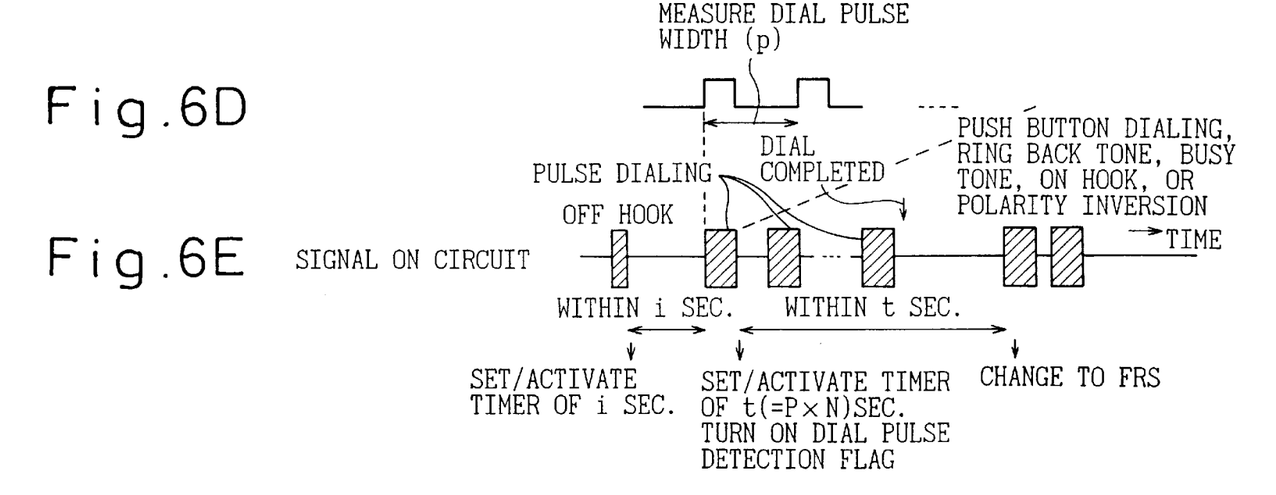

FIG. 6D shows the dial pulse width p which is measured at step S58 in FIG. 5.

FIG. 6E shows that, after detecting an off hook at step S42, the timer of i seconds is set at step S45, and then, within the i seconds, when a dial pulse signal is detected at step S51, the dial pulse width of the first pulse is measured, and within t seconds after the timer of t seconds is set, during steps S46–S50, when the polarity inverted signal is detected, when the change to an on hook is detected, when the push button dial signal is detected, when the ring back tone is detected, or when the busy tone is detected, then the process changes to the fast retraining sequence at step S53. When the number of digits being dialed is less as in the case of a local call, the time necessary to complete the dialing is shorter, and accordingly, the detection of the telephone circuit signaling such as the ring back tone can be effected within a short time after the activation of the timer of t seconds so that the change to the fast retraining sequence is effected earlier.

Figure 6F:
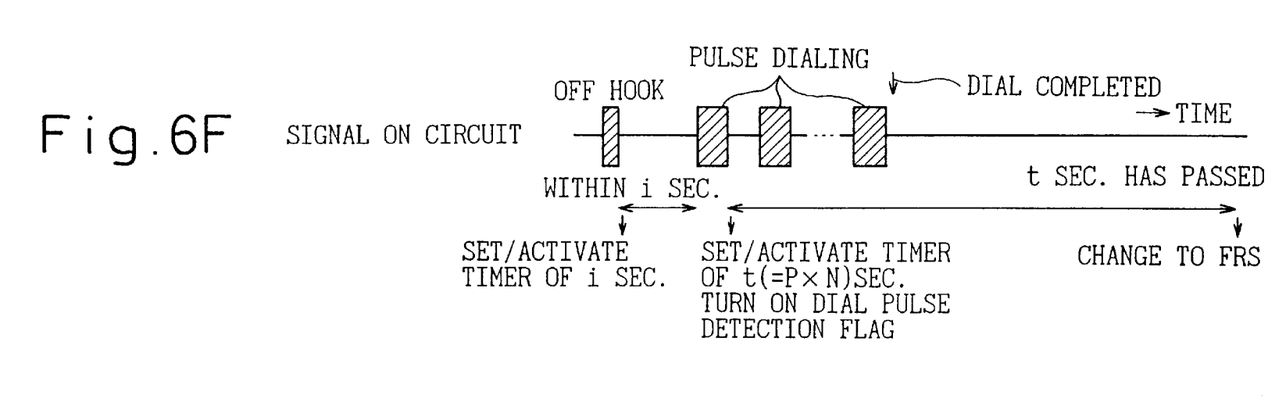

FIG. 6F shows that, after detecting an off hook at step S42, the timer of i seconds is set at step S45, and then, within the i seconds, when a dial pulse signal is detected at step S51, the dial pulse width of the first pulse is measured, and when the timer of t seconds times out at step S52, the process transfers to the fast retraining sequence at step S53.

In the above description, the system has no splitter on the line for separating high frequency components for ADSL and low frequency components for telephone communication, however, it should be noted that those skilled in the art can easily apply the present invention to a system with a splitter.

From the foregoing description, it will be apparent that, according to the present invention, when a data error occurs during ADSL data communication, a fast retraining sequence is executed only when a predetermined telephone signal is received in a case when a dial pulse is not received within a predetermined time, or, when the dial pulse is received within a predetermined time, the fast retraining sequence is executed only when a telephone circuit signal is received within a second predetermined time or when the second predetermined time becomes time out. In this way, the process does not change to the initial training due to the dial pulse during execution of the fast retraining sequence, so that the recovery of the data communication can be effected in short time depending on the length of the dial pulse signal.

What is claimed is:

1. A fast retraining method in an xDSL transceiver comprising steps of:
   detecting an error in a telephone circuit connected to said xDSL transceiver;
   setting, when the cause of said error is a change from an on hook state to an off hook state of a telephone instrument connected to said telephone circuit, a predetermined handshake waiting time having a starting point which coincides with the time of changing from an on hook state to an off hook state of the telephone instrument connected to said telephone circuit, and having a length longer than a dial pulse waiting time; and
   changing the process in said xDSL transceiver to a fast retraining sequence when said handshake waiting time has passed without detecting a predetermined signal in said telephone circuit.

2. The fast retraining method according to claim 1, wherein said predetermined signal is one of a signal indicating that the polarity of a signal in said telephone circuit has been changed, a signal indicating a change from an on hook state to an off hook state of the telephone instrument connected to said telephone circuit, a push button dial signal from the telephone instrument connected to said telephone circuit, a ring back tone from the telephone instrument connected to said telephone circuit, and a busy tone from the telephone instrument connected to said telephone circuit.

3. A fast retraining method in an xDSL transceiver comprising steps of:
   detecting an error in a telephone circuit connected to said xDSL transceiver;
   setting, when the cause of said error is a change from an on hook state to an off hook state of a telephone instrument connected to said telephone circuit, a predetermined handshake waiting time having a starting point which coincides with the time of changing from an on hook state to an off hook state of the telephone instrument connected to said telephone circuit, and having a length longer than a dial pulse waiting time; and
   changing the process in said xDSL transceiver to a fast retraining sequence when a predetermined signal in said telephone circuit is detected within said handshake waiting time.

4. A fast retraining method in an xDSL transceiver comprising steps of:
   detecting an error in a telephone circuit connected to said xDSL transceiver;
   setting, when the cause of said error is a change from an on hook state to an off hook state of a telephone instrument connected to said telephone circuit, a predetermined handshake waiting time having a starting point which coincides with the time of changing from an on hook state to an off hook state of the telephone instrument connected to said telephone circuit, and having a length longer than a dial pulse waiting time;
   measuring, when a dial pulse signal on said telephone circuit is detected within said handshake waiting time, a pulse width of said dial pulse signal;
   updating said handshake waiting time by a product $t = N \times p$, where p is said dial pulse width, and N is the product of the maximum number of digits in said dial pulse signal multiplied by the maximum number of pulses per one digit; and
   changing the process in said xDSL transceiver to a fast retraining sequence when said updated handshake waiting time has passed without detecting a predetermined signal in said telephone circuit.

5. A fast retraining method in an xDSL transceiver comprising steps of:
   detecting an error in a telephone circuit connected to said xDSL transceiver;
   setting, when the cause of said error is a change from an on hook state to an off hook state of a telephone instrument connected to said telephone circuit, a predetermined handshake waiting time having a starting point which coincides with the time of changing from an on hook state to an off hook state of the telephone instrument connected to said telephone circuit, and having a length longer than a dial pulse waiting time;
   measuring, when a dial pulse signal on said telephone circuit is detected within said handshake waiting time, a pulse width of said dial pulse signal;

updating said handshake waiting time by a product t=N×p, where p is said dial pulse width, and N is the product of the maximum number of digits in said dial pulse signal multiplied by the maximum number of pulses per one digit; and changing the process in said xDSL transceiver to a fast retraining sequence when a predetermined signal in said telephone circuit is detected within said updated handshake waiting time.

6. A fast retraining method in an xDSL transceiver comprising steps of:

detecting an error in a telephone circuit connected to said xDSL transceiver;

setting, when the cause of said error is a change from an on hook state to an off hook state of a telephone instrument connected to said telephone circuit, a predetermined handshake waiting time having a starting point which coincides with the time of changing from an on hook state to an off hook state of the telephone instrument connected to said telephone circuit, and having a length longer than a dial pulse waiting time;

measuring, when a dial pulse signal on said telephone circuit is detected within said handshake waiting time, a pulse width of said dial pulse signal;

updating said handshake waiting time by a product t=N×p, where p is said dial pulse width, and N is the product of the maximum number of digits in said dial pulse signal multiplied by the maximum number of pulses per one digit;

judging whether or not said dial pulse signal comes through other than a predetermined telephone center;

updating, when it is judged that said dial pulse signal comes through other than the predetermined telephone center, said value N to N2=N+α and updating said handshake waiting time said handshake waiting time by a calculated value t2=N2×p; and changing the process in said xDSL transceiver to a fast retraining sequence when said updated handshake waiting time has passed or when a predetermined signal in said telephone circuit is detected within handshake waiting time.

7. A fast retraining apparatus in an xDSL transceiver comprising:

an error detecting unit for detecting an error in a telephone circuit connected to said xDSL transceiver;

an off hook detecting unit for judging whether or not the cause of said error is a change from an on hook state to an off hook state of a telephone instrument connected to said telephone circuit;

a timer for measuring, when said off hook detecting unit judges that the cause of said error is a change from an off hook state to an on hook state of the telephone instrument connected to said telephone circuit, a predetermined handshake waiting time having a starting point which coincides with the time of changing from an on hook state to an off hook state of telephone instrument connected to said telephone circuit, having a length longer than a dial pulse waiting time; and a fast retraining sequence executing unit for executing a fast retraining sequence when said handshake waiting time has passed without detecting a predetermined signaling in said telephone circuit.

8. The fast retraining apparatus according to claim 7, wherein said predetermined telephone circuit signaling is one of an inversion of the polarity of a signal in said telephone circuit, a change detecting signal from an on hook state to an off hook state of the telephone instrument connected to said telephone circuit, a push button dial signal from the telephone instrument connected to said telephone circuit, a ring back tone from the telephone instrument connected to said telephone circuit, and a busy tone from the telephone instrument connected to said telephone circuit.

9. A fast retraining apparatus in an xDSL transceiver comprising:

an error detecting unit for detecting an error in a telephone circuit connected to said xDSL transceiver;

an off hook detecting unit for judging whether or not the cause of said error is a change from an on hook state to an off hook state of a telephone instrument connected to said telephone circuit;

a timer for measuring, when said off hook detecting unit judges that the cause of said error is a change from an off hook state to an on hook state of the telephone instrument connected to said telephone circuit, a predetermined handshake waiting time having a starting point which coincides with the time of changing from an on hook state to an off hook state of the telephone instrument connected to said telephone circuit, and having a length longer than a dial pulse waiting time;

a signal detecting unit for detecting a predetermined signal in said telephone circuit; and a fast retraining sequence executing unit for executing a fast retraining sequence when said signal detecting unit detects said predetermined signal in said telephone circuit within said handshake waiting time.

10. A fast retraining apparatus in an xDSL transceiver comprising:

an error detecting unit for detecting an error in a telephone circuit connected to said xDSL transceiver;

an off hook detecting unit for judging whether or not the cause of said error is a change from an on hook state to an off hook state of a telephone instrument connected to said telephone circuit;

a timer for measuring, when said off hook detecting unit judges that the cause of said error is a change from an off hook state to an on hook state of the telephone instrument connected to said telephone circuit, a predetermined handshake waiting time having a starting point which coincides with the time of changing from an on hook state to an off hook state of the telephone instrument connected to said telephone circuit, and having a length longer than a dial pulse waiting time;

a signal detecting unit for detecting a predetermined signal in said telephone circuit;

a fast retraining sequence executing unit for executing a fast retraining sequence when said signal detecting unit detects said predetermined signal in said telephone circuit within said handshake waiting time;

a dial pulse width measuring unit for measuring, when a dial pulse signal on said telephone circuit is detected within said handshake waiting time, the pulse width of said dial pulse signal; and a timer set time updating unit for updating said handshake waiting time by a product t=N×p, where p is said dial pulse width, and N is the product of the maximum number of digits in said dial pulse signal multiplied by the maximum number of pulses per one digit;

wherein said fast retraining sequence executing unit is activated when said updated handshake waiting time has passed without detecting said predetermined signal in said telephone circuit.

11. A fast retraining apparatus in an xDSL transceiver comprising:

an error detecting unit for detecting an error in a telephone circuit connected to said xDSL transceiver;

an off hook detecting unit for judging whether or not the cause of said error is a change from an on hook state to an off hook state of a telephone instrument connected to said telephone circuit;

a timer for measuring, when said off hook detecting unit judges that the cause of said error is a change from an off hook state to an on hook state of the telephone instrument connected to said telephone circuit, a predetermined handshake waiting time having a starting point which coincides with the time of changing from an on hook state to an off hook state of the telephone instrument connected to said telephone circuit, and having a length longer than a dial pulse waiting time;

a signal detecting unit for detecting a predetermined signal in said telephone circuit;

a fast retraining sequence executing unit for executing a fast retraining sequence when said signal detecting unit detects said predetermined signal in said telephone circuit within said handshake waiting time;

a dial pulse width measuring unit for measuring, when a dial pulse signal on said telephone circuit is detected within said handshake waiting time, the pulse width of said dial pulse signal; and a timer set time updating unit for updating said handshake waiting time by a product $t=N \times p$, where p is said dial pulse width, and N is the product of the maximum number of digits in said dial pulse signal multiplied by the maximum number of pulses per one digit;

wherein said fast retraining sequence executing unit is activated when said predetermined signal in said telephone circuit is detected within said handshake waiting time updated by said timer set time updating unit.

12. A fast retraining apparatus in an xDSL transceiver comprising:

an error detecting unit for detecting an error in a telephone circuit connected to said xDSL transceiver;

an off hook detecting unit for judging whether or not the cause of said error is a change from an on hook state to an off hook state of a telephone instrument connected to said telephone circuit;

a timer for measuring, when said off hook detecting unit judges that the cause of said error is a change from an off hook state to an on hook state of the telephone instrument connected to said telephone circuit, a predetermined handshake waiting time having a starting point which coincides with the time of changing from an on hook state to an off hook state of the telephone instrument connected to said telephone circuit, and having a length longer than a dial pulse waiting time;

a signal detecting unit for detecting a predetermined signal on said telephone circuit;

a fast retraining sequence executing unit for executing a fast retraining sequence when said signal detecting unit detects said predetermined signal in said telephone circuit within said handshake waiting time;

a dial pulse width measuring unit for measuring, when a dial pulse signal on said telephone circuit is detected within said handshake waiting time, the pulse width of said dial pulse signal;

a timer set time updating unit for updating said handshake waiting time by a product $t=N \times p$, where p is said dial pulse width, and N is the product of the maximum number of digits in said dial pulse signal multiplied by the maximum number of pulses per one digit;

a dial pulse judging unit for judging whether or not said dial pulse comes through other than a predetermined telephone center; and a parameter updating unit for updating when said dial pulse judging unit judges that said dial pulse comes through other than the predetermined telephone center, said value N to $N2=N+\alpha$ and for updating said handshake waiting time by a calculated value $t2=N2 \times p$;

wherein said fast retraining sequence executing unit is activated when said handshake waiting time updated by said parameter updating unit has passed or when said predetermined signal in said telephone circuit is detected within said handshake waiting time.

* * * * *